United States Patent [19]

Blüml et al.

[11] 4,367,655

[45] Jan. 11, 1983

[54] METHOD AND APPARATUS FOR MEASURING THE CLOSING AND HOLDING FORCE ON PRESSURE DIECASTING AND INJECTION MOULDING MACHINES

[75] Inventors: Hans Blüml, Burgthann; Gerhard Schmidt, Wendelstein, both of Fed. Rep. of Germany

[73] Assignee: Mannesmann Demag Kunststofftechnik Zweigniederlassung der Mannesmann Demag Aktiengesellschaft, Nuremberg, Fed. Rep. of Germany

[21] Appl. No.: 169,656

[22] Filed: Jul. 17, 1980

[30] Foreign Application Priority Data

Jul. 18, 1979 [DE] Fed. Rep. of Germany ....... 2928940

[51] Int. Cl.³ .............................................. G01L 5/00
[52] U.S. Cl. .................... 73/862.54; 73/818; 425/170
[58] Field of Search ...................... 73/862.54, 818, 825; 425/170, 169; 100/99

[56] References Cited

U.S. PATENT DOCUMENTS

| 170,467 | 11/1875 | Boomer | 73/818 |
| 264,435 | 10/1882 | Boschert | 73/818 |
| 3,534,442 | 10/1970 | Mahle | 425/170 X |

Primary Examiner—Charles A. Ruehl

[57] ABSTRACT

A method and an apparatus for measuring the closing and holding force on the moulding die or tool (6, 7) of a pressure diecasting or injection moulding machine of which the closing device comprises a toggle lever mechanism. Measurement of the closing and holding force takes place by way of measuring a deformation of that end plate (4) on which the bars (1) and the toggle lever mechanism (10) are supported. The bars (1) and the toggle lever mechanism (10) transmit to the end plate (4) forces which produce a bending moment. The bending moment leads to a comparatively large deformation which is therefore readily measured by a measuring device (14, 24) associated with the end plate. By arranging the measuring device (14, 24) at the end plate (4), one also avoids damage to the measuring device (14, 24) by the movable parts of the closing device and access to the pressure diecasting or injection moulding machine by the operator is not impeded (FIG. 1).

9 Claims, 2 Drawing Figures

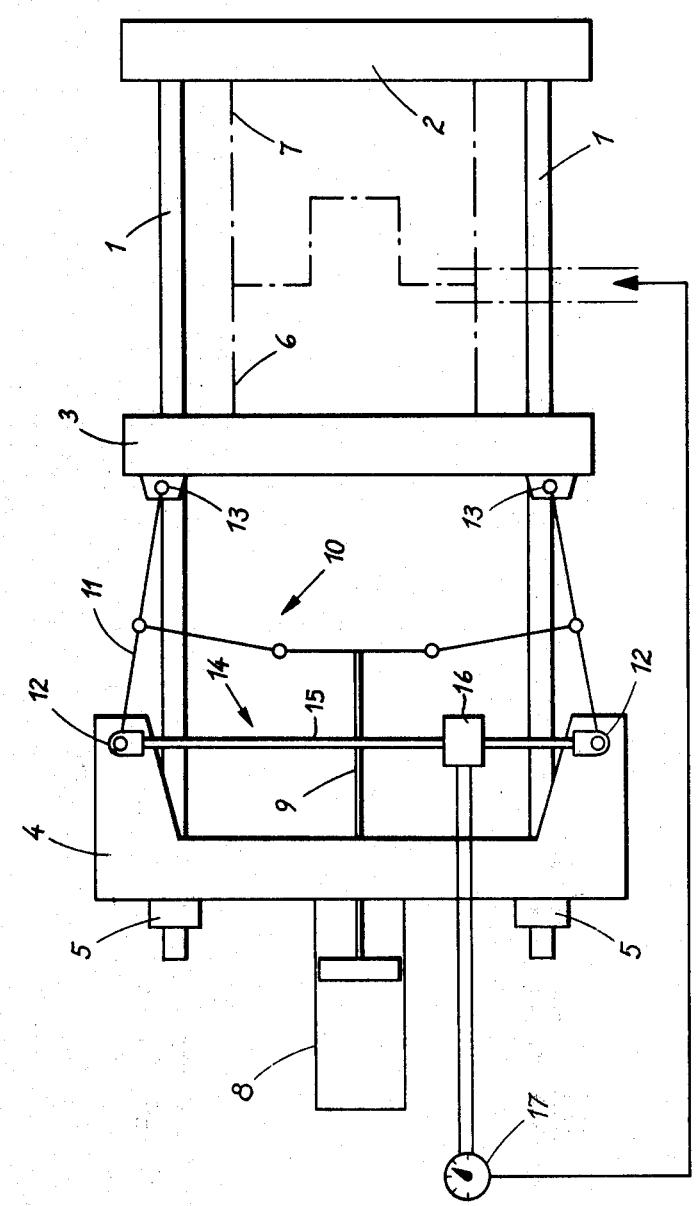

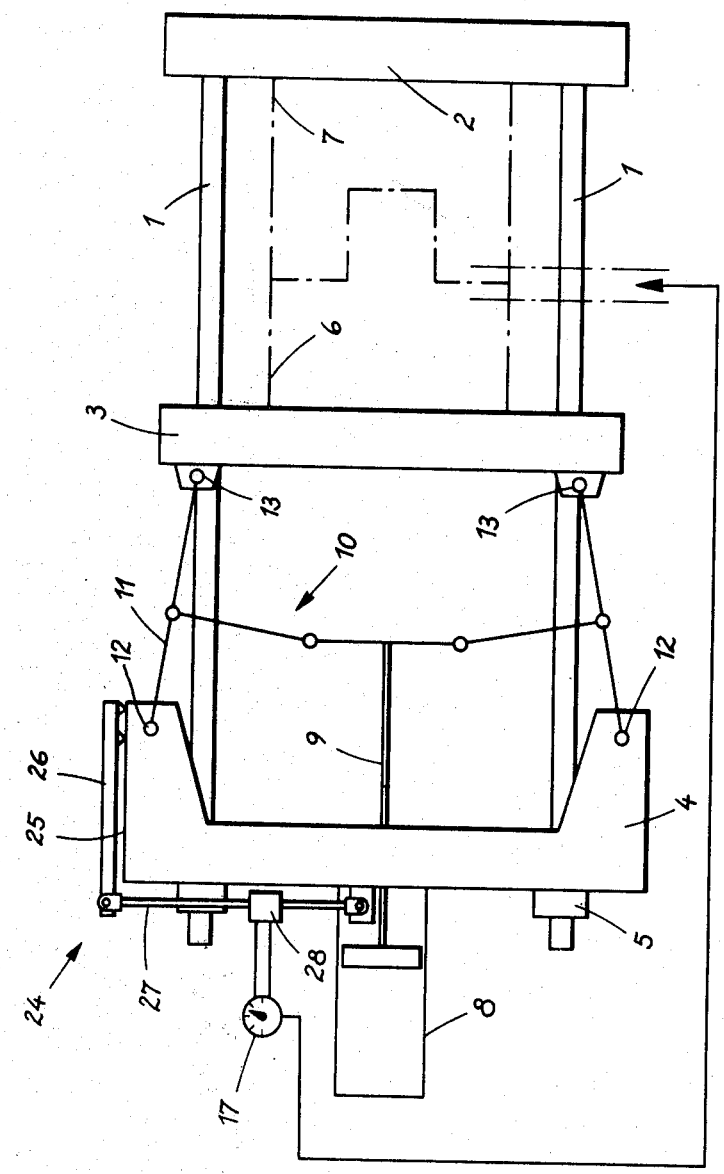

METHOD AND APPARATUS FOR MEASURING THE CLOSING AND HOLDING FORCE ON PRESSURE DIECASTING AND INJECTION MOULDING MACHINES

The invention relates to a method for measuring the die or tool closing and holding force on pressure diecasting and injection moulding machines of which the closing device comprises a toggle lever mechanism, wherein elastic deformation at part of the closing device is detected as a measure for the closing and holding force. The invention also relates to an apparatus for performing this method.

The force holding the tool closed in pressure diecasting and injection moulding machines for the most part determines the quality of the moulding. If it is not sufficiently higher than the opening force in the tool, there is a tendency of the tool to 'breathe' at the separating plane and this leads to the formation of flashes on the moulding. Since the closing and holding force can change during operation of the machine as a result of temperature effects, it is necessary to monitor the machine continuously to enable the setting of the tool height i.e. the distance between the die backing plates to be corrected when necessary. It is known to measure the closing and holding force by wire strain gauges mounted at the bars of the moulding machine. However, this method is disadvantageous because it has been found that the distribution of forces in the bars is often not uniform, e.g. as a result of non-parallel tool faces, so that the measurement at only one bar will lead to incorrect conclusions about the actual level of the closing and holding force. Measurement at all four bars of the moulding machine by means of wire strain gauges mounted thereon and recalculating any differences in the measurement to give the effective total force is extremely costly and cumbersome.

Another disadvantage of measuring the elastic elongation at the bars, whether by means of wire strain gauges or other sensors is that the space available at the bars for applying the measured value transmitters is very restricted. This is because the available length of bar is necessary for the movable tool backing plate during closing and opening of the tool. For this reason there is always a danger that the measuring device will be damaged. It is also known to detect the closing and holding force by way of a direct measurement of the change in spacing between the tool backing plates. This method of measurement is likewise not reliable because the tool backing plates become deformed under load but the deformation depends on the size of the tool. Thus, in order to enable detection of the holding force that actually occurs, it would be necessary in this method of measuring to undertake fresh calibration for each tool size.

A disadvantage common to all the known measuring methods is that the elastic deformations of the respective parts of the closing device used for the measurement are very small so that the setting and calibration is comparatively difficult and the measurements may contain a relatively large error.

It is the object of the present invention to provide a measuring method and a suitable apparatus therefor, with which a substantially accurate conclusion about the actual closing and holding force on the tool can be drawn by measuring elastic deformation at a part of the closing device.

According to the invention, deformation at the end plate on which the toggle lever mechanism and the bars are supported is detected as a measure for the closing and holding force.

The invention is based on the consideration that, by reason of the forces introduced by the bars on the one hand and by the toggle lever mechanism on the other, the end plate is subjected to a deformation in bending that is directly proportional to the holding force, any difference in the force application to the four bars making itself evident in the amount of bending. The result of the measurement is therefore independent of non-uniform force distribution of the holding force and thus also independent of influences brought about by the level of inherent stiffness of the tool because they no longer have any effect on the deformation of the end plate.

Another important advantage is that the deformation in bending of the end plate is relatively large so that even the deflection of the end plate could be selected as a measuring value. However, it is more advantageous to detect a change in the spacing between two points of the end plate as a measuring value because, by reason of the forces acting on the end plate, the regions of the end plate where the pivot points of the toggle lever mechanism are disposed move apart and this change in distance has been found to be considerably larger than for example the elastic change in length that one can measure at the bars under the tensile forces that occur. It is therefore possible to detect as a measure for the closing and holding force the spacing between two points of the end plate disposed on a substantially radial connecting line.

Advantageously, one detects the change in the spacing between two points of the end plate each disposed in the vicinity of the two points where the toggle lever mechanism is pivoted to the end plate. This is because this change in spacing and thus the detected measured value are the largest. There are therefore no setting and calibrating difficulties and it has been found that the error in measurement when detecting the holding force by the method of the present invention is only in the order of 1.5%.

It is also advantageous for the end plate to be a readily accessible component on the moulding machine that is disposed beyond the manipulating range of the operator and also beyond the closing device itself. There is therefore no danger of damaging the measuring device and the latter will not impede the operator's access to the moulding machine.

The apparatus according to the invention for measuring the tool closing and holding force is provided at a closing device comprising a toggle lever mechanism supported between a tool backing plate and an end plate and comprises a measuring element which detects elastic deformation at a part of the closing device and converts it into an analogous quantity as a measure for the closing and holding force. According to the invention, the measuring element is disposed at the end plate and detects the elastic deformation thereof.

The measuring element may be disposed between two measuring points at the end plate which are radially spaced from each other relatively to the central axis of the closing device and the change in spacing of which may be detected from the deformation that occurs in bending. However, it is also possible to provide at the end plate a connecting element such as a measuring beam between two preferably comparatively widely outwardly disposed points of the end plate and to detect the change in spacing of a further point of the end plate, namely the deflection, from the connecting element.

However, the largest measuring distance is achievable if the measuring element is, according to a further embodiment, disposed between two points of the end plate in the vicinity of the respective pivot connections between the toggle lever mechanism and the end plate. The pivot connections of the toggle lever mechanism to the end plate are disposed outside the points where the bars engage the end plate as referred to the axis of the closing device. On the one hand, this produces the bending moment utilized by the method according to the invention that leads to the bending deformation of the end plate. On the other hand, this also produces a comparatively large spacing transversely to the longitudinal axis of the moulding machine between the measuring points which move in opposite directions during deformation. The deformation between these points becomes all the more marked if, as is usual, the pivot connections of the toggle lever mechanism engage lugs or attachments of the end plate that project axially towards the tool.

The measuring device according to the invention is also simple to provide on existing moulding machines which are already in use. In this case, a measuring beam extending beyond that end face of the end plate which is remote from the tool is secured to a side face of the end plate in the vicinity of one pivot point of the toggle lever mechanism, the measuring element being disposed between the free end of the measuring beam and a radially more inwardly disposed point of the end plate. The measuring beam transmits the deformation of the end plate rearwardly, suitable dimensioning making it possible to amplify this deformation by a particular ratio.

Practically any measuring method for detecting an elastic deformation can be employed within the scope of the invention. By reason of the comparatively large deformation, however, inductive or capacitative measurement is preferable, it being possible to display the measured value directly or to use it to set the tool height when it becomes necessary to change the holding force. Measurement by means of wire strain gauges or piezo elements is also possible if an element loadable on account of deformation of the end plate, for example a strain rod of which the deformation or loading force is detected is disposed between the measuring points in the vicinity of the pivot points of the toggle lever mechanism. In the latter case, the strain rod must be so resilient that it will not markedly impede the elastic deformations that occur.

Examples of the invention will now be described in more detail with reference to the accompanying drawings, wherein:-

FIG. 1 is a purely diagrammatic side elevation of a closing device for an injection moulding machine for processing plastics materials with a first embodiment of measuring apparatus according to the invention, and FIG. 2 is a view similar to FIG. 1 with a second embodiment of the measuring apparatus.

In FIGS. 1 and 2, the closing devices and the parts of the injection moulding machine co-operating therewith are shown in thin lines whereas the actual measuring apparatus is depicted in heavier lines for the sake of clarity.

The injection moulding machine comprises guide bars 1, to one end of which a fixed tool backing plate 2 is secured whereas a movable tool backing plate 3 as well as an end plate 4 are displaceable thereon. The end plate 4 is supported on the guide bars 1 by adjustable nuts 5 which may be connected to means (not shown) for adjusting the nuts in unison for the purpose of setting the tool height. These adjusting means may for example comprise a chain which passes over sprockets provided on the adjustable nuts 5 and is driven by a motor controlled according to the desired tool setting.

Between the tool or die backing plates 2, 3 the mould sections 6, 7 of the tool are shown in chain-dotted lines.

At the back of the end plate 4 there is secured a hydraulic cylinder 8 of which the piston rod 9 is passed through the end plate 4 and acts on the central portion of a toggle lever mechanism which is generally indicated at 10. The toggle lever mechanism serves to close the tool rapidly as well as to lock it and to produce the force for holding it shut. The outer links 11 of the toggle lever mechanism 10 are pivoted to lugs 12 of the end plate 4 and to lugs 13 of the movable tool backing plate 3. Referred to the piston rod 9, the lugs 12 are disposed beyond the points at which the forces of the bars 1 engage the end plate 4. By reason of this manner of introducing the force to the end plate 4, during application of the holding force in the tool a bending moment is produced in the end plate 4 that deforms same in such a way that the lugs 12 are moved apart. Since the forces arising in the outer links 11 and in the bars 1 are directly proportional to the holding force, the same applies to the bending moment effective in the end plate 4 and consequently also to the resultant bending deformation.

A measuring device generally indicated at 14 between the lugs 12 of the links 11 has a measurement receiving portion consisting for the most part of a measuring rod 15 and a coil 16. The measuring rod 15 as well as the coil 16 are pivoted to the lugs 12. The measuring rod 15 forms a core for the coil 16 so that, when the lugs 12 are displaced, the position of the core is changed relatively to the coil 16 of which the induction also alters. The change in induction can be measured by means of a measuring device 17, if desired after it has been amplified. A connecting line terminating in an arrow and leading to the two tool sections 6, 7 indicates that the measured value transmitted by the coil 16 can be used directly as the existing value for setting the desired height of the tool. Although this is not indicated in the drawing, the existing value of the tool holding force delivered by the coil 16 for this purpose is fed to a circuit which compares this existing value with the desired value of the tool holding force and, on a departure therefrom, actuates the aforementioned means for adjusting the adjustable nuts 5.

In FIG. 2, since the parts of the injection moulding machine remain unaltered, they have been provided with the same reference numerals as in FIG. 1. The measuring device 24 is in this embodiment not disposed between the lugs 12 and the end plate 4 but on the outer side of the end plate 4 so that it is possible to apply the measuring apparatus subsequently to injection moulding machines which already exist and may be in use. For this purpose, a measuring beam 26 is rigidly secured to the upper face 25 of the end plate 4 which is substantially formed by the projection in which the lug 12 is located. The securing point of the measuring beam 26 is disposed near the lug 12, i.e. as closely as possible to that edge of the side face 25 which is adjacent the tool. The rear end of the measuring beam 26 extends slightly beyond the end face of the end plate 4 that is remote from the tool. It is pivoted to a measuring rod 27 which co-operates with a coil 28 in the same way as has been explained in connection with FIG. 1. The coil 28 is pivoted in the vicinity of the center point of the end plate 4. The changes in spacing between the free end of the measuring beam 26 and the pivot point of the coil 28 occuring during deformation in bending of the end plate 4 are converted to changes in the induction of the coil 28 and these can again be detected by the measuring device 17.

As explained, in this embodiment the measuring apparatus is disposed on the outside of the end plate 4, i.e. even beyond the protective cover of the injection moulding machine and can therefore be subsequently built in without any fundamental difficulties.

We claim:

1. A method of measuring the closing and holding force exerted on a moulding tool of a pressure die casting machine or an injection moulding machine, said machine having as a closing and holding device a toggle lever mechanism with toggle levers which are pivoted to projecting lugs of an end plate which is supported on bars of the machine, and to a tool backing plate which is slidable on said bars, the lugs projecting towards said tool backing plate, comprising the step of: determining the change in distance between a point on said end plate at one of said lugs and a point on said end plate spaced from said one lug in a direction transverse to said bars by an amount equalling at least approximately half the distance between said lugs, to thereby measure said closing and holding force.

2. A method of measuring the closing and holding force according to claim 1, wherein said point is located at the other one of said lugs.

3. In a die casting or injection moulding machine having an end plate supported on bars extending with their axes parallel to one another, a first tool backing plate fixedly secured on said bars opposite to said end plate, a second tool backing plate between said end plate and said first tool backing plate and movable on said bars in parallel direction thereto, a mould tool secured to said second tool backing plate, a toggle lever mechanism as a holding and closing device for moving said movable tool backing plate and for closing said mould tool, said toggle lever mechanism having toggle levers pivoted to lugs on said end plate, which project towards said movable tool backing plate, and also pivoted to the movable tool backing plate, said lugs being offset with respect to the bars in a direction normal to the axes of the bars: a measuring apparatus for measuring the closing and holding force exerted onto said mould tool, said apparatus comprising a measuring element extending between a point at one of said lugs and a point on said end plate spaced from said lug in a direction transverse to said bars by an amount equalling at least approximately half the distance between said lugs, for measuring the change in distance of said points under the deflection of the end plate when loaded by said holding and closing force.

4. In a machine according to claim 3, wherein said point on said end plate is located at the other one of said lugs.

5. In a machine according to claim 3, wherein said measuring element comprises an inductive displacement transducer.

6. In a machine according to claim 3, wherein said measuring element comprises a capacitative displacement transducer.

7. In a machine according to claim 3, wherein said measuring element comprises a resiliently deformable rod secured between said points on the end plate, and wire strain gauges on said rod for measuring the deformation under load thereof.

8. In a machine according to claim 3, wherein a measuring beam extending beyond the end face of the end plate which is remote from the tool is secured to a side face of the end plate in the vicinity of a pivot point of the toggle lever mechanism, and wherein said measuring element is disposed between the free end of said measuring beam and said point on said end plate.

9. In a die casting or injection moulding machine having an end plate supported on bars extending with their axes parallel to one another, a first tool backing plate fixedly secured on said bars opposite to said end plate, a second tool backing plate between said end plate and said first tool backing plate and movable on said bars in parallel direction thereto, a mould tool secured to said second tool backing plate, a toggle lever mechanism as a holding and closing device for moving said movable tool backing plate and for closing said mould tool, said toggle lever mechanism having toggle levers pivoted to lugs on said end plate, which project towards said movable tool backing plate, and also pivoted to the movable tool backing plate, said lugs being offset with respect to the bars in a direction normal to the axes of the bars: a measuring apparatus for measuring the closing and holding force exerted onto said mould, said apparatus comprising as a measuring element a resiliently deformable rod extending between a point on said end plate at one of said lugs and a point on said end plate spaced from said lug in a direction transverse to said bars by an amount equalling at least approximately half the distance between said lugs, and secured to said end plate, said rod comprising a force transducer for measuring the load acting in said rod as a measure of said holding and closing force.

* * * * *